No. 847,245. PATENTED MAR. 12, 1907.
P. E. DAWSON.
VEHICLE WHEEL.
APPLICATION FILED AUG. 29, 1906.
2 SHEETS—SHEET 1.
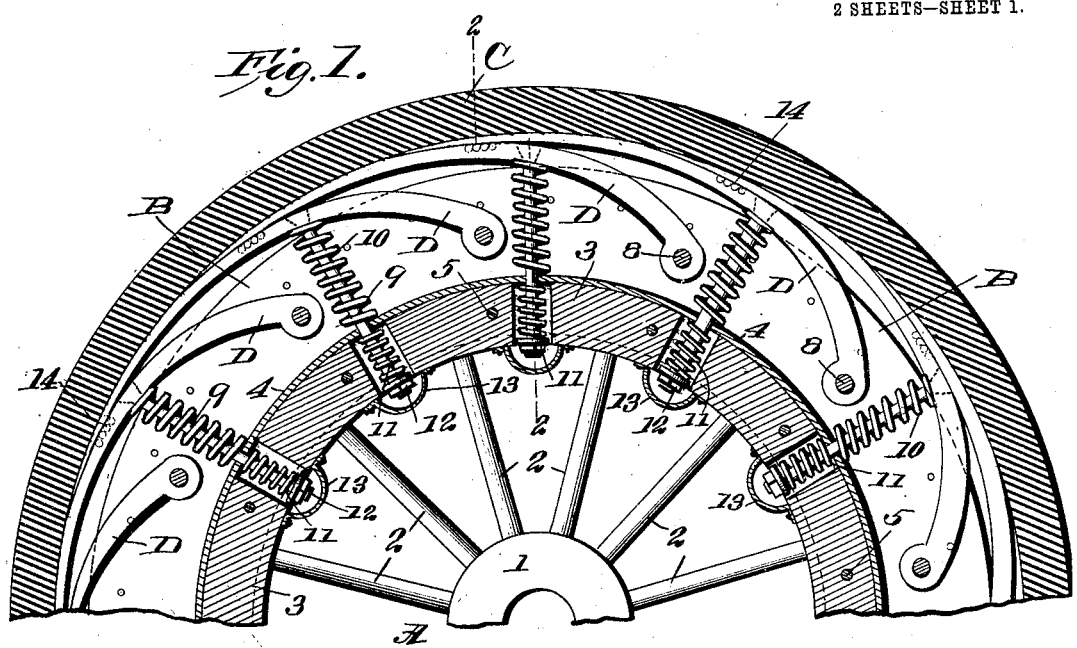
WITNESSES
E. M. Callaghan
Amos W. Hart
INVENTOR
PETER E. DAWSON
BY Munn & Co.
ATTORNEYS No. 847,245. PATENTED MAR. 12, 1907.
P. E. DAWSON.
VEHICLE WHEEL.
APPLICATION FILED AUG. 29, 1906.
2 SHEETS—SHEET 2.
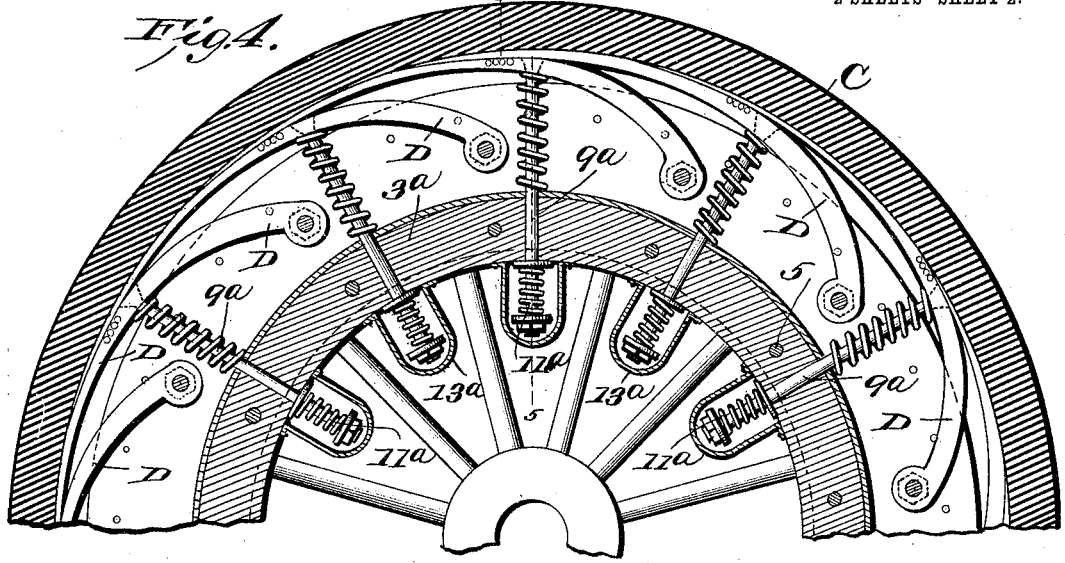
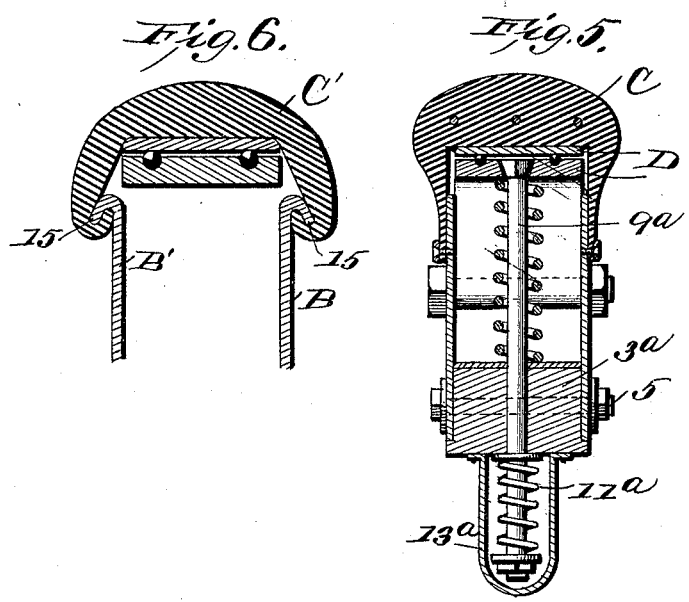
WITNESSES
E. M. Callaghan
Amos W. Hart
INVENTOR
PETER E. DAWSON
BY Munn & Co.
ATTORNEYS

UNITED STATES PATENT OFFICE.

PETER E. DAWSON, OF HANCOCK, MARYLAND.

VEHICLE-WHEEL.

No. 847,245.  Specification of Letters Patent.  Patented March 12, 1907.

Application filed August 29, 1906. Serial No. 332,418.

*To all whom it may concern:*

Be it known that I, PETER E. DAWSON, a citizen of the United States, and a resident of Hancock, in the county of Washington and State of Maryland, have invented an Improvement in Automobile-Wheels, of which the following is a specification.

The object of my invention is the production of a wheel which shall be distinguished by great resiliency, strength, and durability of its rim portion, the same having a punctureless elastic tire and air inflation being dispensed with. To this end I have adopted the construction, arrangement, and combination of parts hereinafter described, and illustrated in the accompanying drawings, in which—

Figure 1 is a section of a portion of a wheel constructed according to my invention. Fig. 2 is a cross-section on the line 2 2 of Fig. 1. Fig. 3 is a detail section illustrating the arrangement of antifriction-balls between overlapping rim portions. Fig. 4 is a section similar to Fig. 1, save that certain springs are differently arranged. Fig. 5 is a cross-section on the line 5 5 of Fig. 4. Fig. 6 is a sectional view showing a modification of a portion of the invention.

Referring in the first instance to Figs. 1, 2, 3, A indicates the central portion of the complete wheel, it being virtually a rigid inner wheel formed of a hub 1, spokes 2, a wooden rim 3, and a metallic tire 4.

Annular metal plates B (see Fig. 2) are applied to the sides of the wooden rim 3 and secured thereto by transverse bolts 5. The inner edges of said plates abut against shoulders 6, formed on the sides of the wooden rim 3. C is a solid-rubber tire which is grooved interiorly, and thus made practically trough-shaped, and the same is applied over the outer edges of the parallel metal plates B, and its tapered sides or flaps extend down on the said plates and are secured thereto by rivets or screws that pass through annular metal strips 7. Within the annular space provided between such rubber tire C and the metallic rim 4 of the inner wheel A, I arrange a series of curved, tapered, and overlapping spring-plates, which are pivoted at 8 on transverse bolts passing through the side plates B. The pivotal points, as shown in Fig. 2, are located about one-third of the distance from the metallic rim 4 of the inner wheel A to the inner side of the rubber tire C.

As shown, the spring-plates curve outward and their tapered end portions are practically formed on curves concentric with the tire C, against which they bear. A bolt 9 is connected with each of the pivoted spring-plates D at a point about one-third of the distance from the pivot 8 to the outer extremity of the plate, and such bolt passes through the rim 4 and wooden felly 3 of the inner wheel A, it being encircled exterior to the rim by a spiral spring 10 and by another spiral spring 11, arranged interiorly of the rim 4 and within a cavity formed in the felly 3. A nut and washer 12 are applied to the inner end of each bolt 9, and a cap 13 is applied over the same, said cap being provided with flanges by which it is secured by screws to the felly 3.

The outer spring 10 is larger and stronger than the inner one, 11, and its function is to press the pivoted spring-plates D outward against the elastic rim C, and thus hold the same normally distended. The inner and weaker spring 11 resists the outward tension caused by the spring 10 to a certain degree, which may be increased at will by adjustment of the nut 12. By the arrangement of the two springs in this manner and with the elastic tire C applied to the curved spring-plates I produce a highly-elastic wheel-rim, which is at the same time distinguished by great strength and durability and is especially adapted to resist torsion or lateral stress incident to use.

It will be seen that by the curved form and the overlapping of the plates D, I produce virtually a wheel-rim which may be independent of the elastic and inclosing tire C, so that should the latter be cut, torn, or ruptured in such manner as to render it inoperative, or even if it should become entirely detached by accident, an effective wheel-rim will still remain which may be serviceable for temporary use.

It will be seen that the elastic tire C may be readily detached should occasion require and that access may be had to the nuts 12 by removing the caps 13; also, that dust and moisture are excluded from the space in which the pivoted and curved spring-plates D are arranged.

In order to relieve friction between the spring-plates D, balls 14 may be arranged as shown in Fig. 3, the same being located in a longitudinal groove formed in the underlying plate D and the outer plate resting upon the balls, and thus held just out of contact with the inner plate.

In the modification shown in Fig. 4 the bolts 9ᵃ pass through and beyond the wooden rim 3ᵃ of the inner wheel and extend beyond the same far enough to receive spiral springs 11ᵃ, elongated caps 13ᵃ being applied over the same, as shown. In other words, the modification shown in Figs. 4 and 5 differs from the wheel shown in Figs. 1 and 2 solely in the location or arrangement of the inner springs.

In Fig. 6 I illustrate a modification in the attachment of the elastic wheel-rim C' to the side plates B', the latter being provided at their outer edges with hooks 15, turned outwardly and inwardly, and the side edges of the tire C' are correspondingly curved inward, so as to engage said hooks, as shown. It will be understood, therefore, that I propose to employ any suitable means of connection between the inner edges of the elastic rim C' and the side plates attached to the felly of the inner wheel.

The heads of the bolts 9 are made square or polygonal and fit in corresponding holes in the spring-plates D, so that the bolts are held from rotating when their nuts are being turned. The holes in the felly 3 and rim 4 are also made slightly oblong to allow due space for the bolts to "play" when the spring-plates D move inward or outward under varying degrees of compression.

What I claim is—

1. The improved wheel comprising an inner rigid wheel and an outer inclosing elastic rim consisting of a tire which is grooved interiorly, rigid metal plates secured to the sides of the felly of the inner wheel and projecting outwardly therefrom, a series of curved and overlapping plates pivoted to and between the side plates, and spring attachments connected with such curved plates and with the rim of the inner wheel, whereby the curved plates are pressed outward and serve to hold the elastic tire duly distended, substantially as described.

2. The improved wheel comprising an inner part having a concentric rim, an outer elastic part comprising a tire, a series of pivoted, curved, and overlapping plates pivotally connected with the rim of the inner wheel and bearing outward against the tire, and springs arranged between the pivoted plates and the rim of the inner wheel, for exerting pressure outward, substantially as described.

3. The improved wheel comprising a rigid inner portion having a concentric rim, an elastic outer portion comprising a grooved or trough-shaped tire, side plates secured to the rim of the inner portion and to the overlapping edges of the elastic tire, curved spring-plates pivoted to and between such side plates, springs applied between the curved plates and the rim of the inner portion, and antifriction-bearings comprising balls arranged in grooves between the overlapping plates, substantially as described.

4. In a wheel of the class indicated, the combination, with a rigid inner portion having a concentric rim, and annular side plates secured to the said rim, of curved plates pivoted to and between such side plates, an elastic tire which is grooved interiorly and applied over the overlapping plates and extended downward on the side plates and secured thereto, bolts attached to said curved plates and passing through the rim of the inner portion, and springs applied to such bolts exterior to said rim, substantially as described.

5. In a wheel of the class indicated, the combination, with the inner rigid wheel having a concentric rim provided with radial recesses and metal plates secured to the sides of said rim and projecting outwardly therefrom, of curved plates which are pivoted to and between said side plates, bolts attached to the said plates and passing through the rim of the inner wheel and two spiral springs applied to said bolts, one exterior to, and the other interior of, the inner wheel-rim, substantially as described.

6. In a wheel of the class indicated, the combination, with the rigid inner wheel, of annular plates secured to its concentric rim and extending outward and parallel, curved plates pivoted to and between such side plates, bolts connected with the curved plates and passing through the rim of the inner wheel, springs applied to such bolts, an elastic tire applied over the curved plates and extending inward and detachably connected with the outer portions of the side plates, and caps applied over the inner ends of the bolts, for excluding dust, substantially as described.

7. An improved wheel comprising a rigid inner portion having a concentric rim, a series of curved plates pivotally connected with said rim, bolts connected with the curved plates and the rim of the inner wheel, and springs applied to said bolts exteriorly and interiorly of the rim of the inner wheel, substantially as described.

8. In a wheel of the class indicated, the combination, with an inner rigid frame, of a series of curved spring-plates which are pivotally connected at one end with said frame and overlap each other as described, and a spring attachment comprising bolts and springs connected with the curved plates and the inner frame, substantially as described.

PETER E. DAWSON.

Witnesses:
A. A. SWINGLE,
GEO. W. SMITH.